United States Patent
Dietz (10) Patent No.: US 7,878,150 B2
(45) Date of Patent: Feb. 1, 2011

(54) MULTIPLE FUNCTION ANIMAL TRAINING SYSTEM WITH EXTENDABLE RAMP

(76) Inventor: Dan Dietz, 10234 Emerald Dr., Houston, TX (US) 77074

( * ) Notice: Subject to any disclaimer, the term of this patent is extended or adjusted under 35 U.S.C. 154(b) by 527 days.

(21) Appl. No.: 11/437,559

(22) Filed: May 19, 2006

(65) Prior Publication Data

US 2006/0260550 A1    Nov. 23, 2006

Related U.S. Application Data

(63) Continuation-in-part of application No. 11/344,655, filed on Jan. 30, 2006, which is a continuation-in-part of application No. 11/287,716, filed on Nov. 28, 2005, now Pat. No. 7,234,415, which is a continuation-in-part of application No. 11/121,797, filed on May 4, 2005, now Pat. No. 7,237,506.

(51) Int. Cl.
*A01K 1/03* (2006.01)
*A01K 1/035* (2006.01)

(52) U.S. Cl. .................... 119/482; 119/28.5; 119/847; 14/69.5

(58) Field of Classification Search ............... 119/28.5, 119/482, 485, 706, 847, 849; 14/69.5, 71.1
See application file for complete search history.

(56) References Cited

U.S. PATENT DOCUMENTS

| | | |
|---|---|---|
| 2,532,863 A | 12/1950 | Taylor |
| 2,579,797 A | 12/1951 | Churchfield et al. |
| 3,234,908 A | 2/1966 | Doskocil |
| 3,618,568 A | 11/1971 | Breeden |
| 4,224,899 A | 9/1980 | Cruchelow et al. |
| 4,253,204 A | 3/1981 | Tasaka |
| 4,334,501 A | 6/1982 | McDaniel et al. |
| 4,347,807 A | 9/1982 | Reich |
| D288,970 S | 3/1987 | Runion |

(Continued)

FOREIGN PATENT DOCUMENTS

FR    2408301    6/1979

(Continued)

OTHER PUBLICATIONS

Notice of Allowance for U.S. Appl. No. 11/121,797 dated Mar. 16, 2007.

(Continued)

*Primary Examiner*—Rob Swiatek
(74) *Attorney, Agent, or Firm*—Daniel N. Lundeen; Lundeen & Lundeen, PLLC (57) ABSTRACT

A multi-purpose furniture structure and system may be used for caring for an animal throughout the life of the animal. For small animals such as puppies, this furniture system may be used to train the animal to behave in a desired manner. Animal toys are stored in the animal living space as well. Animals may use a detachable ramp member to climb to the top of the furniture structure. The ramp is extendable allowing for the ability to vary the length of the ramp. This feature enables the owner to change the angle of inclination of the ramp to accommodate animals that may have difficulty climbing steeper ramp inclines. For larger or older animals, the extendable ramp may serve as a bed or as a means to help the animal get into the bed of the owner. The furniture piece may be positioned adjacent an owner's bed.

12 Claims, 5 Drawing Sheets

U.S. PATENT DOCUMENTS

| | | | |
|---|---|---|---|
| 4,719,656 A | 1/1988 | Godinet | |
| 4,838,204 A | 6/1989 | Young | |
| 4,845,792 A * | 7/1989 | Bakula et al. | 14/69.5 |
| 5,148,768 A | 9/1992 | Hinton | |
| 5,211,130 A | 5/1993 | Elias et al. | |
| D369,885 S | 5/1996 | Zeiler | |
| 5,662,065 A | 9/1997 | Bandimere et al. | |
| 5,765,505 A | 6/1998 | Yun | |
| 5,778,822 A | 7/1998 | Giffin et al. | |
| 5,803,523 A * | 9/1998 | Clark et al. | 296/26.1 |
| 5,964,189 A | 10/1999 | Northrop et al. | |
| 6,189,487 B1 | 2/2001 | Owen et al. | |
| 6,250,529 B1 | 6/2001 | Babbitt et al. | |
| 6,267,082 B1 | 7/2001 | Naragon et al. | |
| 6,295,950 B1 | 10/2001 | Deitrich et al. | |
| 6,484,344 B1 * | 11/2002 | Cooper | 14/71.1 |
| 6,490,995 B2 | 12/2002 | Greene, Jr. | |
| 6,588,366 B1 | 7/2003 | Ranson et al. | |
| 6,598,253 B1 * | 7/2003 | Allen et al. | 14/71.1 |
| 6,732,676 B1 * | 5/2004 | Smith | 119/496 |
| 6,748,895 B2 | 6/2004 | Besenzoni | |
| 7,234,415 B2 * | 6/2007 | Dietz | 119/28.5 |
| 2002/0152969 A1 | 10/2002 | Grigsby et al. | |
| 2003/0066489 A1 | 4/2003 | Whitehill | |
| 2004/0134433 A1 | 7/2004 | Holder | |
| 2004/0177814 A1 | 9/2004 | Godshaw | |
| 2005/0279286 A1 | 12/2005 | Youngmark | |
| 2006/0011289 A1 | 1/2006 | Suriano | |
| 2006/0042548 A1 | 3/2006 | Tharalson et al. | |
| 2006/0112897 A1 | 6/2006 | Moore | |
| 2006/0118051 A1 | 6/2006 | Lima | |

OTHER PUBLICATIONS

Office Action for U.S. Appl. No. 11/121,797 dated Dec. 12, 2006.
Office Action for U.S. Appl. No. 11/121,797 dated Aug. 21, 2006.
Notice of Allowance for U.S. Appl. No. 11/287,716 dated Mar. 16, 2007.
Office Action for U.S. Appl. No. 11/287,716 dated Dec. 29, 2006.
Office Action for U.S. Appl. No. 11/287,716 dated Sep. 8, 2006.
PCT International Search Report for International Application No. PCT/US2006/017361 dated Sep. 12, 2006 (2 p.).
PCT International Search Report for International Application No. PCT/US2006/017029 dated Sep. 15, 2006 (2 p.).
PCT International Search Report for International Application No. PCT/US2006/017011 dated Sep. 11, 2006 (2 p.).

* cited by examiner

MULTIPLE FUNCTION ANIMAL TRAINING SYSTEM WITH EXTENDABLE RAMP

CROSS-REFERENCE TO RELATED APPLICATIONS

This application is a continuation-in-part of U.S. application Ser. No. 11/344,655 filed on Jan. 30, 2006, which is a continuation-in-part of U.S. application Ser. No. 11/287,716 filed on Nov. 28, 2005, now U.S. Pat. No. 7,234,415, which is a continuation-in-part of U.S. application Ser. No. 11/121,797 filed on May 4, 2005, now U.S. Pat. No. 7,237,506, which are each incorporated by reference herein in their entirety.

STATEMENT REGARDING FEDERALLY SPONSORED RESEARCH OR DEVELOPMENT

Not applicable.

BACKGROUND OF THE INVENTION

1. Field of the Invention

This invention relates to furniture for an animal and in particular to a piece of furniture that has multiple configurations and may function in multiple ways to accommodate various desires of the animal at any stage of growth. More particularly, this invention describes a detachable and extendable ramp member attached to the furniture structure. The extendable ramp member allows the owner to vary the ramp length and thereby decrease the angle of inclination during the animal climb.

2. Background of the Invention

For many people, pet animals are members of the family. Some of these pets live inside the home with the owner and have many accessories designed especially for the animal. As with the "dog houses" kept in the yard, some of the furnishings provide a place for the animal to dwell as well as provide a storage place for the toys of the animal. One conventional piece of animal furniture is a bed. There have been many types of animal beds. These beds are available in various designs. Some of the designs include beds shaped as different types of animals. Many beds in the form of animal designs are made of a cushion material to facilitate animal comfort.

One animal bed is disclosed in U.S. Pat. No. 5,662,065 and describes an animal bed that includes an annular bed frame defining an interior chamber. A perforated top wall is supported at its periphery by the bed frame to receive and support the animal above the chamber. The perforated top wall is composed of a non-woven fabric material to provide a hammock-like suspension for the animal and to permit small insects to fall through the top wall. The chamber is dimensioned to provide a space below the top wall sufficient to inhibit the insects from traveling upwardly through the top wall. An insect exterminating composition contained within the chamber receives the falling insects and destroys them.

U.S. Pat. No. d288,970 describes a combined animal bed and housing unit. This design has a bed mat resting on a storage unit. The bed also has a canopy covering the mat. The animal would rest on the mat and would be covered by the canopy.

Although the animal bed is a common piece of furniture for the inside pet, animals do more than just sleep. For indoor animals, there is a need for the animal to know when, where and how to "use the bathroom." Cats usually have a litter box for waste. Many pets and owners have a system by which the pet is let out of the house on a periodic basis to relieve themselves. Pets also have toys with which they play. One particular thing some pets like to do is to climb up on the owner's bed. The climbing is necessary because many pets may not jump high enough to reach the surface of the bed in one jump. The climbing process results in the pet pulling and sometimes tearing the bed linen. Pets also do not stay the same size. As the pet grows, it is often necessary to replace a piece of animal furniture with a different type of furniture or a larger size of the same furniture.

With all of the different types of animal furniture that are available to accommodate the many needs of the pet and pet owner, there remains a need for a multiple function piece of animal furniture. The animal throughout the animal's life may use this piece of furniture. Basically, the piece of furniture may serve as an indoor dwelling for the animal. This piece of furniture could assist in "potty" training animals as well as other behavior training. The multiple function furniture piece may also have components that enable the animal to climb up the furniture and get into an owner's bed. Further, this furniture piece may serve as an elevated bed for larger animals.

For some younger and some older animals, climbing onto the furniture piece may be difficult. With the assistance of a ramp, the climb would be easier. However, in some instances the inclination angle of the ramp on the furniture piece may still be too steep for the animal to easily climb onto the furniture piece. There remains a need for a means to adjust the inclination angle of a ramp member such that an animal may easily climb the ramp member to the top of the furniture piece.

BRIEF SUMMARY OF SOME OF THE PREFERRED EMBODIMENTS

It is an objective of the present invention to provide a multiple purpose animal furniture system that may accommodate uses of animals at all ages.

It is a second objective of the present invention to provide a multiple purpose piece of animal furniture with modular components to provide the capability to reconfigure the furniture as needed.

It is a third objective of the present invention to provide a training cage to assist in training of small animals for indoor living.

It is a fourth objective of the present invention to provide a portable piece of animal furniture that may be positioned adjacent to an owner's bed.

It is a fifth objective of the present invention to provide a detachable and extendable ramp member to assist animals in climbing to the top of the multiple purpose piece of animal furniture.

It is a sixth objective of the present invention to provide a removable floor cover for the furniture piece to facilitate ease of cleaning animal waste.

It is a seventh objective of the present invention to provide a furniture piece with a living and storage area.

It is an eighth objective of the present invention to provide a removable grill-type cover that serves as a guard to keep a smaller animal inside the furniture piece.

It is a ninth objective of the present invention to provide a multiple purpose animal furniture piece that may be used as a bed for an animal or a rest bench for humans.

It is a tenth objective of the present invention to provide a portable piece of animal furniture that may be made of various materials such as wood, plastic or metal.

The present invention provides a multi-purpose furniture piece and system that may be used for an animal throughout the life of the animal. For small animals such as puppies, this furniture system may be used as a dwelling in which the owner may train the animal to behave in a desired manner. The animal training may include animal potty training. Animal toys may also be stored in the animal living space as well. A removable barrier such as a grate or plastic ventilated sheet may cover a front opening to prevent movement of the animal in and out of the furniture piece. Animals may use a detachable ramp member to climb to the top of the furniture piece. For larger or older animals, the furniture piece may serve as a bed or as a means to help the animal get into the bed of the owner. The furniture piece may form a bed for animals of all ages. The bed may be positioned adjacent an owner's bed.

The ramp member is also extendable. The owner may vary the length of the ramp such that the angle of inclination of the ramp against the animal furniture piece may vary. The ability to vary the climbing angle sometimes may be desirable to assist animals that have difficulty climbing a ramp positioned at a steeper angle. The extendable ramp structure may be of various designs and may comprise two or more sections. The sections are slidably attached to each other such that a lower section moves relative to an upper section to vary the length of the ramp. The movement of the lower section may be in discrete intervals or may be designed to vary the ramp length to any desirable length.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 7b illustrates a side view of the extendable ramp embodiment of FIG. 7a;

DETAILED DESCRIPTION OF THE PREFERRED EMBODIMENTS

The multiple function animal furniture piece provides an animal owner with a system they may use for an animal throughout the life of the animal. The multiple function animal furniture piece may serve as a training cage to help train small animals such as puppies for living indoors. A detachable mat on the floor of the multiple function animal furniture piece provides for ease in cleaning animal waste. A removable front cover such as a grill or grate may serve to restrict undesired movement of the animal in and out of the multiple function animal furniture piece. As an animal gets older and/or bigger, the animal may no longer dwell inside the multiple function animal furniture piece. At this point, the multiple function animal furniture piece may have another function as a storage structure. As will be discussed, the multiple function animal furniture piece has an attachable ramp member for use by an animal to climb to the top of the furniture structure. This ramp is especially useful for smaller animals and older animals. The ramp may be stored inside the multiple function animal furniture piece when the ramp is not in use. This multiple function animal furniture piece is portable and may be positioned adjacent the owner's bed. In this arrangement, the animal may easily move from the multiple function animal furniture piece to the owner's bed. Further, the owner may easily sit on the top of the multiple function animal furniture piece. When an animal dies, the multiple function animal furniture piece may be converted into a container (e.g., coffin) for burying the deceased animal.

Figure 1:
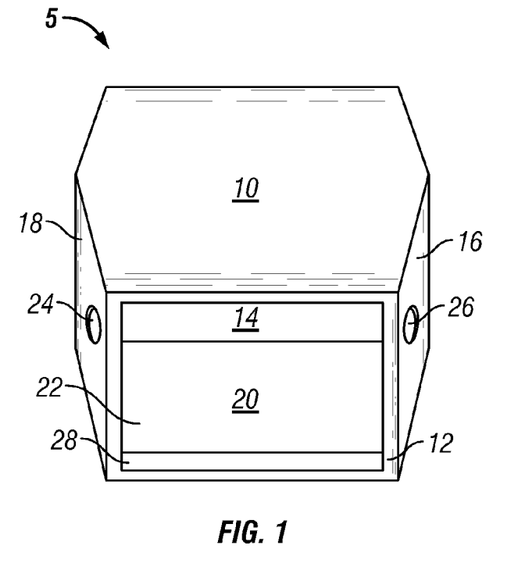
FIG. 1 illustrates a front, top and side view of the multiple function animal furniture piece.

FIG. 1 shows a general design of the multiple function animal furniture piece 5. Other configurations such as those described in U.S. Pat. No. 7,234,415 and U.S. Pat. No. 7,237,506 may be implemented to achieve the same results as the design described in FIG. 1. As shown, multiple function animal furniture piece 5 has a top 10, open front side 12, a back side 14, and multiple side walls 16 and 18. The number of sides may vary with the particular design shape. Multiple function animal furniture piece 5 may also contain a floor 20. The front side 12 has an opening 22, which covers a large portion of the front side 12. Without limitation, this large opening 22 allows for animals to easily enter multiple function animal furniture piece 5. The opening 22 also allows for easy insertion of toys and food and water trays into the furniture piece. In addition, smaller openings 24 and 26 may be disposed in the side walls 16, 18. These openings 24, 26 improve ventilation in multiple function animal furniture piece 5. The front side 12 also has a lip 28 that extends up from the base. Without limitation, this lip 28 serves to prevent toys such as balls from accidentally rolling out of multiple function animal piece 5. In addition, a lip section may also be attached to the top 10 to serve as, without limitation, restraining means to stabilize the cushion and keep the cushion stationary when an animal is resting on it.

Multiple function animal furniture piece 5 may be composed of any material suitable for the uses of multiple function animal furniture piece 5. For instance, multiple function animal furniture piece 5 may be composed of wood, mesh, wire, plastic, metal, and the like. In an embodiment, back side 14 and/or multiple side walls 16 and 18 may include a plurality of openings in addition to openings 24, 26. The additional openings may be of any desired shape and configuration. In such an embodiment, back side 14 and/or multiple side walls 16 and 18 may comprise wire, mesh, netting, weaving, and the like, preferably wire or mesh, and more preferably wire or wire-like material. Moreover, back side 14 and/or multiple side walls 16 and 18 may be composed of any porous material suitable for use as a side in an animal cage (e.g., porous metal or plastic siding). In an embodiment, back side 14 and/or multiple side walls 16 and 18 are composed of a plastic, wood, metal, or the like wire or wire-like material. One or more of multiple side walls 16 and 18 (preferably all) may be composed of such materials. In an embodiment (not illustrated), an outer covering may be disposed on the outside and/or inside surface of one or more of back side 14 and/or multiple side walls 16 and 18, preferably an outer covering is disposed on the outside surface. In some embodiments, an outer covering is disposed on the outside surface of multiple side walls 16 and 18 and back side 14. The outer covering may cover any desired portion of a side. The outer covering may comprise any suitable covering for use with animals. For instance, the outer covering may be composed of natural or synthetic woods, veneers, vinyl, wicker, plastic, ceramic, and the like. In an embodiment, top 10 and/or front side 12 may also be composed of such plurality of openings and alternatively may also include such an outer covering. In alternative embodiments, at least one side and/or wall of multiple function animal furniture piece 5 comprises a substantially solid material.

Figure 2:
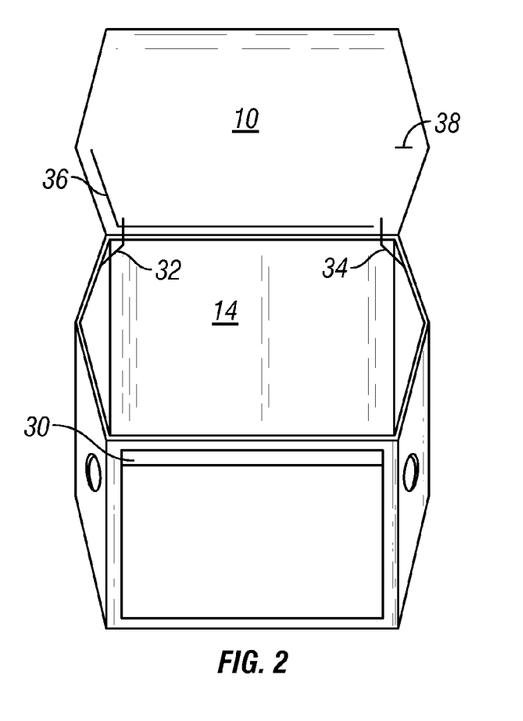
FIG. 2 illustrates a view of the multiple function animal furniture piece with the top extended up to open the furniture piece.

FIG. 2 shows multiple function animal furniture piece 5 with the top 10 extended in an upward position, which thereby opens up multiple function animal furniture piece 5. As shown, a bar 30 extends across the front side of multiple function animal furniture piece 5 and serves as a rest bar for the top 10. Hinges 32 and 34 attach the top 10 to the back side 14 and allow the top 10 to open and close as desired. Attached to the inside surface of the top 10 is a rack member 36 for holding a ramp member when the ramp member is not in use. The rack member 36 has an L-shape that fits with the shape of a rectangular ramp member. This L-shaped rack may be a groove with a generally u-shape in which the ramp member is placed. When the ramp member is placed in the rack member 36, a latch 38 secures the ramp in the rack member 36.

Figure 3:
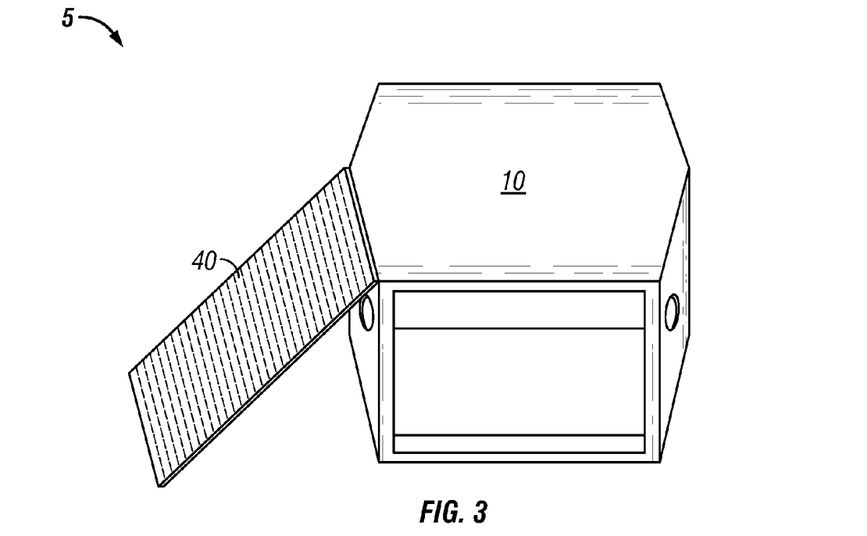
FIG. 3 illustrates a view of the multiple function animal furniture piece with a ramp member extended from the furniture piece.

FIG. 3 shows a configuration of multiple function animal furniture piece 5 with a detachable ramp 40 engaged at one side. In this configuration, an animal may climb to the top 10 without climbing up on a bed or other piece of furniture. Depending on the height of multiple function animal furniture piece 5, the length of the ramp 40 may vary such that the inclination angle formed by the engagement of the ramp 40 to multiple function animal furniture piece 5 is not too steep for the animal to safely climb.

Figure 4:
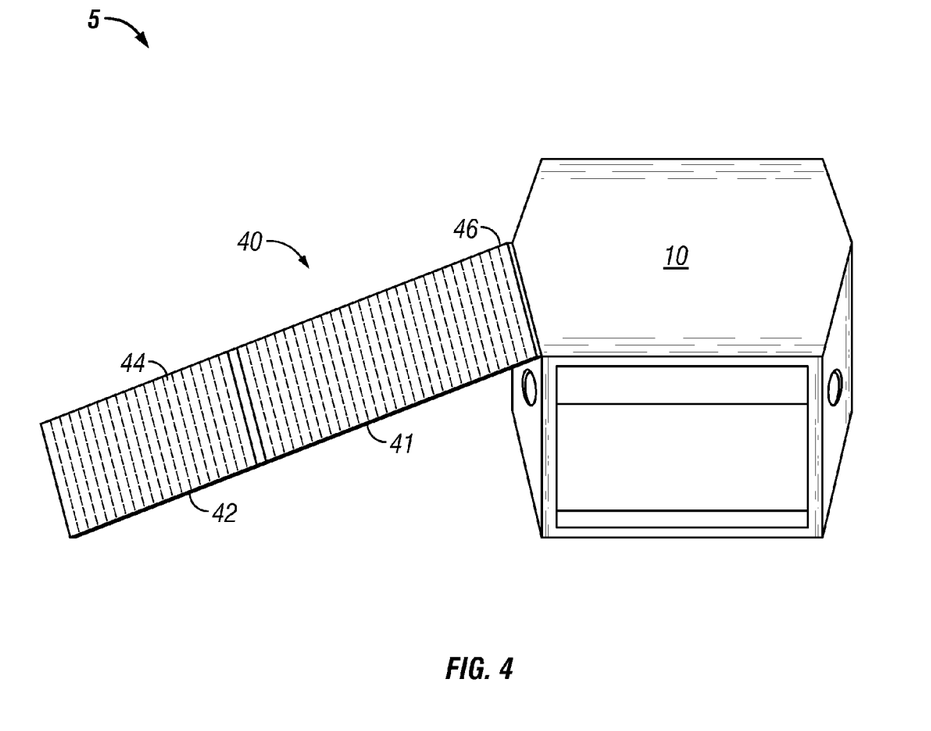
FIG. 4 illustrates a view of the multiple function animal furniture piece with a ramp member extended from the furniture piece such that the angle of inclination is decreased.

FIG. 4 shows a configuration of the multiple function animal furniture piece 5 having the extendable ramp 40. The ramp 40 may comprise two sections. The upper section 41 may have a length similar to the length of the ramp 40 shown in FIG. 3. This upper section 41 has sufficient length such that it may solely assist some animals climbing to the top 10. Attached to this front side of each section may be a fiber-type material 44 such as a cloth or carpet material. This fiber-type material 44 increases the friction of the ramp 40 such that an animal may have good traction as the animal climbs the ramp 40 to the top 10. The ramp 40 contains a lip 46 in the upper section 41 that engages the edge of the top side securing the ramp 40 to the multiple function animal furniture piece 5.

Figure 5:
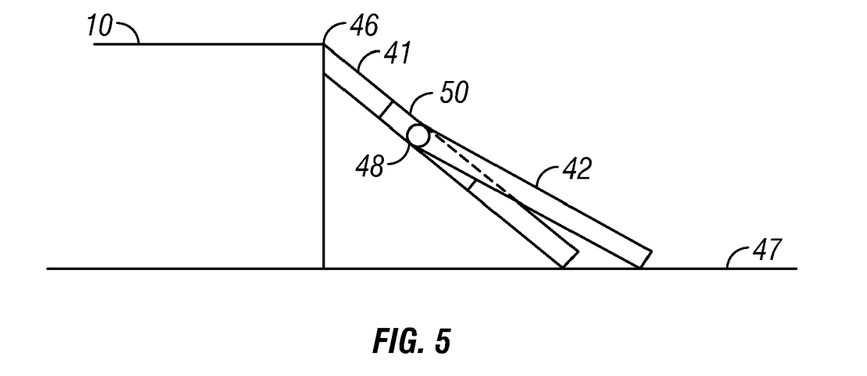
FIG. 5 illustrates a side view of a configuration of an extendable ramp.

FIG. 5 shows a general configuration for an extendable ramp 40. The upper section 41 attaches to the multiple function animal furniture piece 5 using the lip mechanism 46. The top end of the lower section 42 may comprise a bar 48. The bar 48 slidably engages the upper section 41. A translation section 50 facilitates the engagement and attachment of the upper and lower sections 41, 42 of the extendable ramp 40. The lower section 42 extends to the floor 47 or the means that supports the multiple function animal furniture piece 5.

Figure 6A:
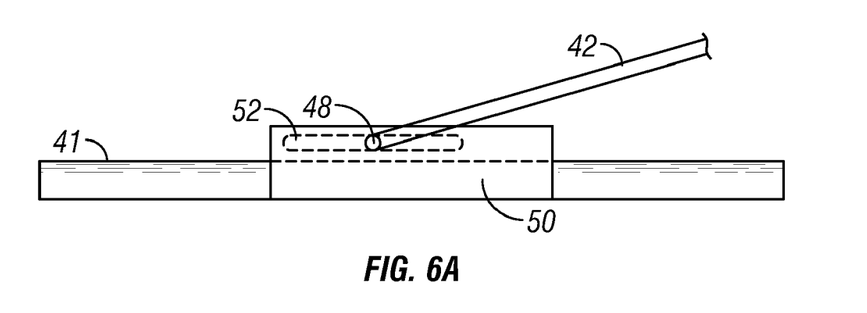
FIG. 6a illustrates a side view of one embodiment of an extendable ramp having a rotatable lower section.
Figure 6B:
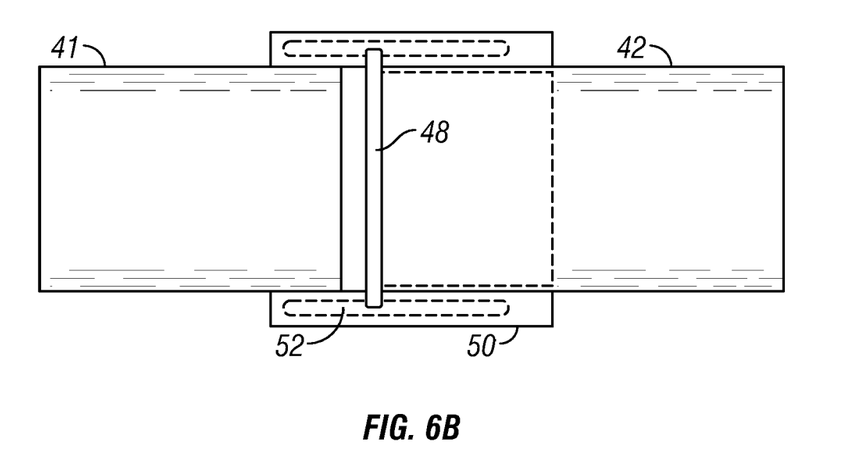
FIG. 6b illustrates a top view of the extendable ramp having a rotatable lower section.

FIGS. 6a and 6b show an embodiment of the extendable ramp 40 that is related to the extendable ramp 40 shown in FIG. 5. The two ramp sections 41 and 42 are slidably attached by the engagement of the bar 48 of the lower section 42 with the translation area 50 of the upper section 41. The bar fits into a groove 52 in the translation area 50. The bar 48 is able to move linearly with the groove 52. The translational movement of the lower section 42 with regard to the upper section 41 may vary the length of the two-section ramp 40.

Figure 7A:
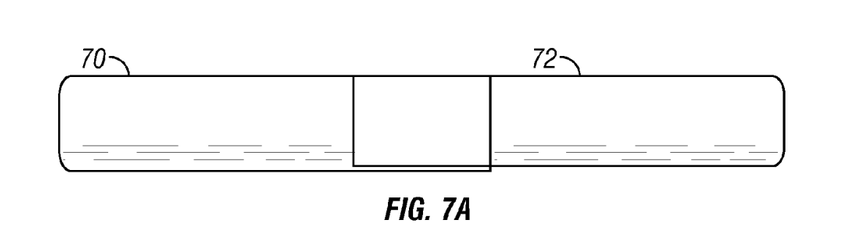
FIG. 7a illustrates a top view of an alternate embodiment of an extendable ramp.
Figure 7B:
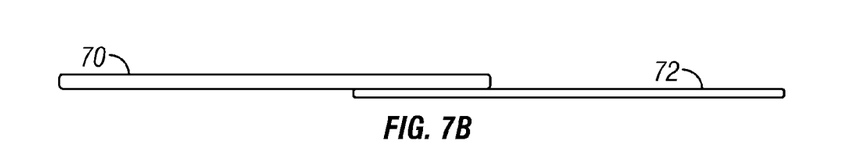

FIGS. 7a and 7b show an alternate embodiment of the extendable ramp 40. In this embodiment, an upper section 70 engages a lower section 72 to form the extendable ramp 40. The linear movement of the sections 70, 72 may vary the length of the ramp 40. In this embodiment, the upper section 70 may also have a means to engage the multiple function animal furniture piece 5 such as the previously mentioned lip member. In addition, the edge of the upper section 70 that engages the multiple function animal furniture piece 5 may be designed such that there is some minimal sway on the ramp 40, which may allow for a rotational movement of the ramp 40 without detaching the ramp 40 from the multiple function animal furniture piece 5.

Figure 8:
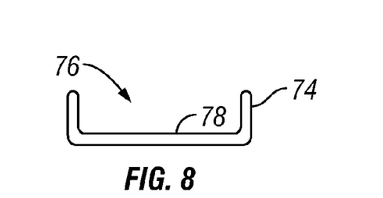
FIG. 8 illustrates an end view of a bracket designed to hold a lower section and provide a guide for movement of the lower section in relation to the upper section of the extendable ramp.
Figure 8A:
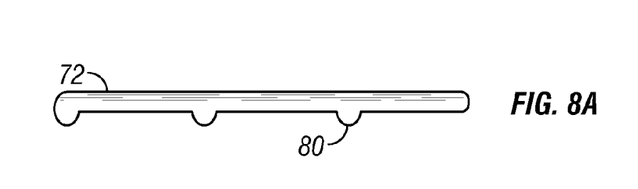
FIG. 8a illustrates a side view of extrusions in the lower section of the extendable ramp.
Figure 8B:
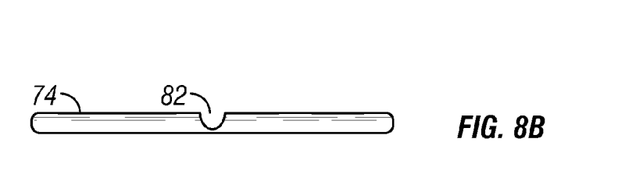
FIG. 8b illustrates a side sectional view of a recess in the bracket for engaging the extrusions from the lower section of the extendable ramp.

FIG. 8 shows a bracket 74 that may be attached to the under side of the upper section 70. The bracket 74 is designed such that channel 76 creates a clearance between the upper section 70 and the bracket surface 78. The lower section 72 may engage the upper section 70 through channel 76. In this embodiment, FIGS. 8a and 8b show a design for the engagement of the lower section 72 with the bracket 74. As shown, in FIG. 8a, the bottom surface of the lower section 72 may have extrusions 80 that may extend downward. FIG. 8b shows recesses 82 in the surface 78 of the bracket 74. These recesses 82 have the same shape as the extrusions 80 to facilitate the engagement of the lower section 72 of the ramp 40 with the bracket 74. The bracket 74 design may be one that extends a portion of the length of the lower section of the ramp 40 and may serve as a translation and engagement area between the upper and lower sections of the ramp in a manner similar to the previously described translation area 50.

Figure 9:
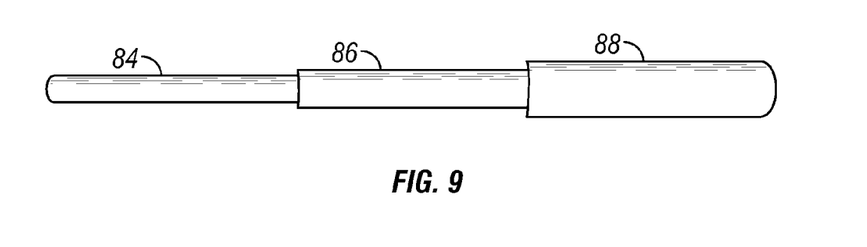
FIG. 9 illustrates a side view of an alternate embodiment having multiple sections of the ramp.

FIG. 9 shows another embodiment of the extendable ramp 40. This configuration comprises multiple sections that may extend and retract as desired by the owner. As shown, the multiple sections 84, 86 and 88 have slightly different areas. Without limitation, this configuration is similar to a telescope design in that one section fits inside the adjacent section.

Figure 10:
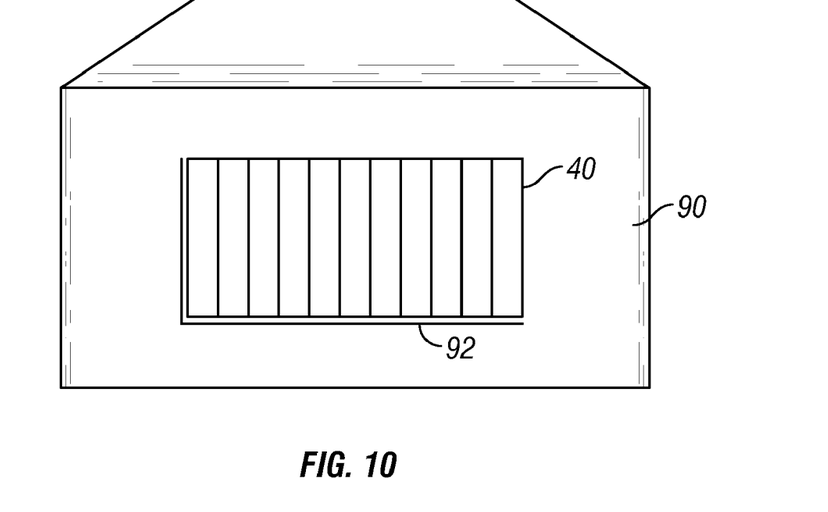
FIG. 10 illustrates a view of the backside of the furniture piece showing the ramp in a stored position.

FIG. 10 is a view of the backside 90 of multiple function animal furniture piece 5 showing the ramp 40 in a stored position. In this configuration, when the ramp 40 is not in use (attached to the multiple function animal furniture piece 5), it may be stored on the backside 90 of the multiple function animal piece 5. The ramp 40 may be retracted to a minimum length and placed in a rack 92 affixed to the backside 90 of the multiple function animal piece 5.

Figure 11:
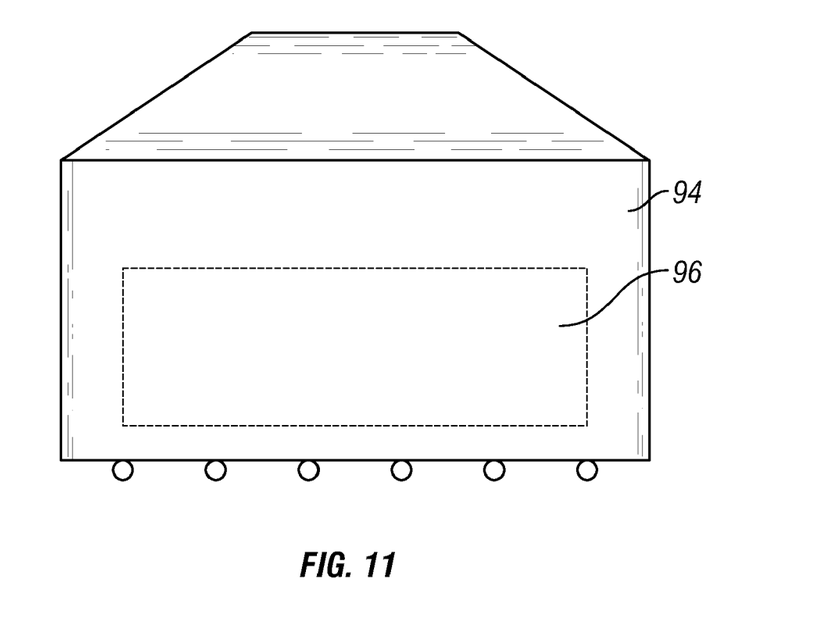
FIG. 11 illustrates a view of the interior top of the furniture piece showing the grate in a stored position.

FIG. 11 is a view of the interior top 94 of the multiple function animal furniture piece 5 showing the grate 96 in a stored position. In this configuration, sets of instructions may be attached to this interior 94. The design of the grate 96 may enable the owner to read the instructions through the grate 96.

As mentioned, the structure and system of the multiple function animal furniture piece 5 provides the owner of an animal with the versatile means for providing care for the animal. This structure and system may accommodate activities for animals of all ages and sizes. The structure serves as both a dwelling for small animals as well as a training cage to teach certain behaviors. The internal storage capacity makes this structure useful for any animal that has toys. The ability to store the detachable components of the system within the structure itself makes this system easy to manage. The portability of the structure enables the owner to position it at any location. As mentioned, owners may use it as a bed for the animal or as a means for the animal to climb into the owner's bed. The attachable ramp also makes it easy for animals of all ages and sizes to climb the ramp to the top side of the structure. At the animal's death, the structure may serve as a container coffin in which to bury the animal.

As mentioned, the configurations for attaching the multiple sections of the ramp may vary. Described herein are only examples of the various configurations one may mechanically design an extendable ramp for use as described herein.

Although the present invention and its advantages have been described in detail, it should be understood that various changes, substitutions and alterations may be made herein without departing from the spirit and scope of the invention as defined by the appended claims.

What is claimed is:

1. A multiple function animal furniture structure comprising:
   a structure having a top side, a bottom side, a back side and at least one side wall, said top side capable of supporting a sleeping material for an animal, and said top side capable of being positioned at multiple angles with regard to said bottom side;
   a front side connected to said top and bottom sides, said front side having a front side opening substantially forming said front side;
   a lip element extending up from said front side and extending the length of said front side;
   a detachable and extendable ramp member, said ramp member providing a surface suitable for an animal to climb to the top side, whereby length and angle of inclination of the surface against the structure can be varied, said ramp member further comprising an upper ramp section and a lower ramp section, wherein the upper and lower ramp sections are slidably attached such that the lower section linearly moves in relation to the upper section, said upper and lower ramp sections being pivotably engaged in a translation area, the translation area encompassing an area along the length of the upper section in which the lower section moves in relation to said upper section, said lower section including a bar slidably engaging a groove in said translation area, the groove having stops to limit movement of the bar to a central intermediate portion of the upper section; and
   wherein the back side, at least one side wall, or combinations thereof comprise a plurality of openings.

2. The multiple function animal furniture structure of claim 1, wherein said upper section comprises an upper edge for engaging the top side of the furniture structure for attaching said ramp member to the furniture structure.

3. The multiple function animal furniture structure of claim 1, wherein said ramp member has a lip member attached on a down side of the said ramp member, said lip engaging the top side of the structure and thereby securing said ramp member to said structure.

4. The multiple function animal furniture structure of claim 1, wherein the back side, at least one side wall, or combinations thereof comprise wire, mesh, netting, weaving, or combinations thereof.

5. The multiple function animal furniture of claim 1, wherein the back side, at least one side wall, or combinations thereof comprise wire or wire-like material.

6. The multiple function animal furniture structure of claim 1, further comprising an outer covering disposed on an outer surface of the back side, at least one side wall, or combinations thereof.

7. A multiple function animal furniture structure comprising:
   a structure having a top side, a bottom side, a back side and at least one side wall, said top side capable of supporting a sleeping material for an animal, and said top side capable of being positioned at multiple angles with regard to said bottom side;
   a front side connected to said top and bottom sides, said front side having a front side opening substantially forming said front side;
   a lip element extending up from said front side and extending the length of said front side;
   a detachable and extendable ramp member, said ramp member providing a surface suitable for an animal to climb to the top side, whereby length and angle of inclination of the surface against the structure can be varied;
   wherein the back side, at least one side wall, or combinations thereof comprise a plurality of openings; and
   a rack member attached to said back side, said rack member capable of securing and holding said ramp member when said ramp member is not in use.

8. A multiple function animal furniture structure comprising:
   a structure having a top side, a bottom side, a back side and at least one side wall, said top side capable of supporting a sleeping material for an animal, and said top side capable of being positioned at multiple angles with regard to said bottom side;
   a front side connected to said top and bottom sides, said front side having a front side opening substantially forming said front side;
   a lip element extending up from said front side and extending the length of said front side;
   a detachable and extendable ramp member, said ramp member providing a surface suitable for an animal to climb to the top side, whereby length and angle of inclination of the surface against the structure can be varied;
   wherein the back side, at least one side wall, or combinations thereof comprise a plurality of openings; and
   a first rack member attached to said back side and a second rack member attached to said top side, said rack members capable of securing and holding said ramp member when said ramp member is not in use.

9. A multiple function animal furniture system for caring for an animal throughout a life of the animal comprising:
   a structure for having an inner space;
   a cover member for covering a front opening in the structure; and
   a detachable and extendable ramp member, said ramp member providing a surface for an animal to climb to a top of the structure, whereby length and angle of inclination of the surface against the structure can be varied, said ramp member further comprising an upper ramp section and a lower ramp section, the upper and lower ramp sections are slidably attached such that the lower section linearly moves in relation to the upper section, said upper and lower ramp sections being pivotably engaged in a translation area, the translation area encompassing an area along the length of the upper section in which the lower section moves in relation to said upper section, said lower section including a bar slidably engaging a groove in said translation area, the groove having stops to limit movement of the bar to a central intermediate portion of the upper section, and wherein at least a portion of the structure comprises a plurality of openings.

10. The multiple function animal furniture system of claim 9, wherein the at least a portion of the structure comprises wire or wire-like material.

11. The multiple function animal furniture system of claim 9, wherein an outer covering is attached to the at least a portion of the structure.

12. The multiple function animal furniture system of claim 9, wherein the at least a portion of the structure comprises wire, mesh, netting, weaving, or combinations thereof.

* * * * *